United States Patent Office 3,286,609
Patented Nov. 22, 1966

3,286,609
LIGHT RECEIVING DEVICE FOR ELECTRICAL EXPOSURE METER FOR CAMERAS
Tatsuo Kobayashi, Kaizuka, and Masaichiro Konishi, Nishinomiya, Japan, assignors to Minolta Camera Kabushiki Kaisha, Osaka, Japan, a corporation of Japan
Filed Mar. 3, 1964, Ser. No. 348,983
2 Claims. (Cl. 95—10)

This invention relates generally to photoelectric exposure meters and more particularly to an exposure meter having simple compensating means that prevent unusually bright background light rays from causing an erroneous shutter setting for the objective lens of a camera.

Many electrical exposure meters employ a light receiving orifice with a double eye condensing lens system. However, such systems are troubled by intense rays of light emanating from the upper portion of the background setting, primarily the sky, such rays being much brighter than the object which is being photographed. This, in turn, causes an indicating needle for the electric exposure meter to register an inappropriate value, so that the camera operator will incorrectly adjust the shutter. Accordingly, in order to avoid such harmful rays of light, usually a pent roof or lattice holes which turn somewhat downwardly have been provided before or after a condensing lens. In an electrical exposure meter, wherein CdS is used and of which areas of light-sensitive elements are extremely small as compared with those of selenium, such light-shading means will be ineffective and of inferior appearance. On the other hand, the position of the light receiving body combined with an electrical exposure meter may be shown, for instance, by the upper front view of the body, or the front end view of a whole peripheral portion of the lens and the circumference of the lens, which may be viewed from the outside. Therefore, the arrangement of parts for a camera is unduly restricted and, in addition, the appearance becomes unsightly.

In the present invention, a light-receiving body is combined with an electrical exposure meter to obviate the above-mentioned disadvantages. The substance of this invention lies in an apparatus, wherein an optical axis of a condenser lens is arranged offset from the central axis of the light-receiving body and both axes are fixed in parallel. Thus, according to the present invention, a deflection angle is utilized to render the upper and lower portions of incident fluxes of rays of light asymmetric with respect to the optical axis of the light receiving body. Such deviation compensates for the intense brightness of the incident rays of light in the sky above the object to be photographed. Accordingly an appropriate exposure value is indicated by the meter. Moreover, since the condenser lens has been merely shifted in parallel with the optical axis without alteration of its ordinary form, its setting is remarkably simple in comparison with a wedge-setting lens, and the appearance of the camera is also pleasing. Furthermore, the lens system according to the present invention is more easily water-proofed and made air-tight than cameras with an eccentric lens of prism type wedge lens in which the optical axis is offset when the lens is fabricated.

Furthermore, the present invention provides a light receiving device for the electrical exposure meter of a camera wherein a condensing lens is provided on a part of the front end surface of the lens body tube, a CdS (cadmium sulfide) light-receiving body is positioned behind the condensing lens. An annular iris diaphragm is rotatably mounted between the condensing lens and the light receiving body, such adjustable diaphragm having a group of iris openings of slit form spaced thereabout.

Thus, according to the present invention, the iris openings correspond to the sensitivity of the films and filter factor utilized within the camera. The light fluxes from the object to be photographed are the same as those passing through the objective lens, and therefore the meter indicates an appropriate exposure. Moreover, even when the iris opening is narrow, the incident light flux forms a narrow slit and strikes a plurality of CdS electrodes, and therefore actuation of a meter needle is accurate, indicating an appropriate value of exposure. Furthermore, since the regulating members are compactly arranged at the front end portion of the lens body tube, freedom for arrangement of other camera parts is increased and a pleasing appearance is achieved.

In the next place, the present invention will be described in detail with reference to embodiments as illustrated in the accompanying drawings, in which.

Figure 1:
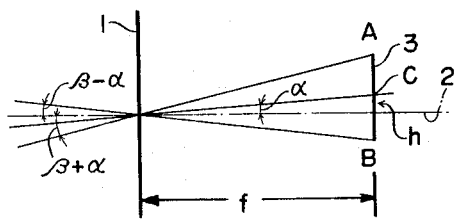
FIGS. 1 and 2 represent a theoretical explanation of the present invention.

Though the present invention is described in detail in the following specification, it is possible to make a number of modifications, within the scope of the invention as described in the appended claims. It is to be noted that similar parts are shown by similar reference numerals throughout the description and drawings.

Figure 2:
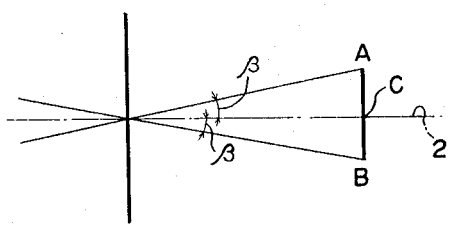
Figure 3:
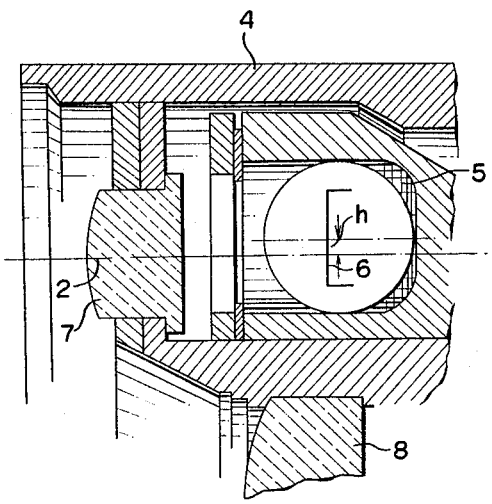
FIG. 3 is a partial longitudinal section of one embodiment of the invention combined with a camera.

To begin with, referring to FIGS. 1 to 3, 1 is a condensing lens member; 2 is an optical axis; 3 is a light sensitive element; 4 is a lens body tube; 5 is a recess; 6 is a CdS-light receiving body and 7 is a condensing lens. The optical axis 2 of condensing lens member 1 has a suitable focal distance $f$, as illustrated in FIG. 1, aligned parallel to the optical axis of the main lens 8. Since axis 2 is also spaced from the center of light sensitive element 3 by a distance $h$, the light flux passing through the center C of light sensitive element 3 is inclined or offset by an angle $\alpha$ corresponding to $\tan \alpha = h/f$ measured along the optical axis. Consequently, the central lines of light fluxes passing respectively through the upper and lower ends A and B of the light sensitive element are inclined across angles identified as $\beta+\alpha$ and $\beta-\alpha$, when these central lines intersect the optical axis 2 at the center C shown in FIG. 2. Such angles are compared with an angle $\beta$ formed by the central lines of light fluxes passing through both ends on the optical axis 2, so that the difference of these angles becomes $2\alpha$. Obviously the angle on the lower side is larger by $\alpha$ and conversely the angle on the lower side is smaller by $\alpha$ with respect to the original optical axis of condensing lens member 1. This relationship insures that harmful rays of light from the sky are decreased correspondingly, and that the exposure meter indicates the correct compensated value of the object sighted through main objective lens 8.

FIG. 3 represents the light receiving body based on the principle shown in FIGS. 1 and 2, wherein the CdS-light receiving body is inserted in the recess portion 5 on the front end surface of lens body tube 4, and the condensing lens 7 is provided with its optical axis 2 offset from the central line of said light receiving body by the distance $h$. Thus, when photographing is performed through objective lens 8, the angle of inclination of light fluxes coming from above the object to be photographed to the CdS-light receiving body 6 is smaller by $2\alpha$ than those of the light rays coming from the lower portion. In consequence, the harmful rays of light are intercepted, so that the meter needle indicates appropriate values of exposure. In this case, said light-receiving body is not limited to a position on the lens body tube, but may be positioned at other suitable places within the camera.

Figure 5:
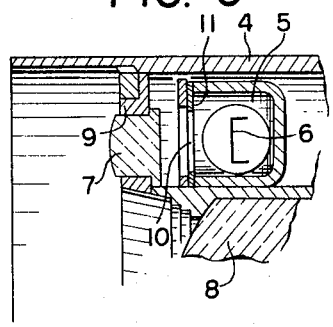
FIG. 5 is a partial longitudinal view of still another modification of the invention.
Figure 4:
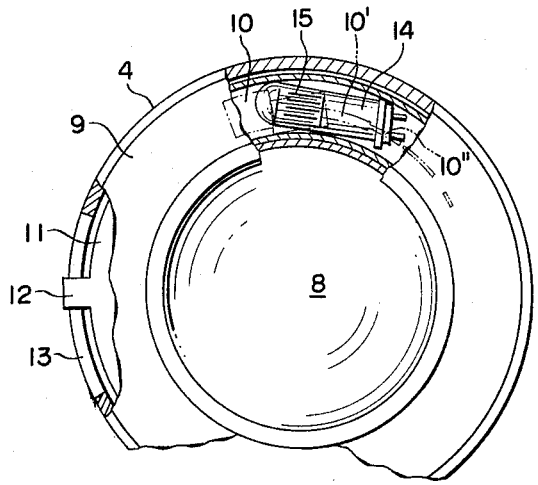
FIG. 4 is a front view of another embodiment of this invention, with a part thereof being removed.

FIGS. 4 through 7 show other embodiments of the present invention. For example, the condensing lens 7 is inserted as illustrated in FIG. 5 in the ring portion 9 on a front portion of lens body tube 4, wherein the name of camera and/or manufacturing number or the like are written, and a CdS-light receiving body 6 is inserted within the recess 5. An annular iris diaphragm 11 having iris openings 10, 10', 10" . . . is rotatably provided, and a projection 12 of said iris diaphragm is projected from slot 13 of lens body tube 4, the side of said slot being provided with a graduation of film sensitivity or filter multiplication factor and, of course, with click stops. Furthermore, the radial projection 12 may be provided in addition with a working ring to be inserted suitably in the periphery of the lens body tube.

Figure 6:
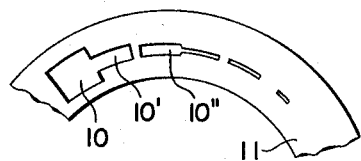
FIGS. 6 and 7 are front views of respective different embodiments of the annular iris diaphragm employed in the invention.
Figure 7:
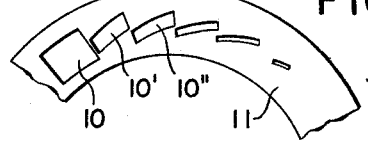

Furthermore, since the recess portion 5 is arranged along the periphery of lens body 4, and since the tubular CdS-light receiving body 6 is inserted in said recess portion, the electrode portion 15 is arranged at an angle to the condensing lens 7 of a window. As shown in FIG. 6, the iris openings 10, 10', 10" . . . are arranged along a circumference of diaphragm 11. Since slit clearance iris openings are used, a plurality of electrodes within case 14 are struck by light fluxes, that is, two or three electrodes are exposed to light passing through a slit. The device shown in FIG. 7 allows the light fluxes to strike more electrodes by means of inclined iris openings that do not follow the radius of curvature of diaphragm 11.

Thus, according to the present invention, as a CdS-light receiving window-condensing lens 7 is arranged at the front end of lens body tube 4, light fluxes from objects to be photographed are the same as those coming through the objective lens 8, and an appropriate exposure value is indicated by the meter. Since the meter regulation by means of film-sensitivity or filters is performed by turning the annular iris diaphragm 11 having a group of slit formed iris openings against the CdS member provided in the front end portion of lens body tube, the photographing is effected conveniently. In consequence, as the incident light flux passes always through a plurality of CdS electrodes, operation of the meter needle is accurate and it indicates an appropriate exposure value. Moreover, as described before, freedom of arrangement of other camera parts is increased by positioning the regulating members at the front portion of the lens body tube, and consequently the appearance of the camera will also be enhanced.

What we claim:

1. A light receiving device for an electrical exposure meter for a camera, said device comprising an annular lens tube body, a main objective lens disposed within said tube, an annular recess formed between said objective lens and said tube body, a condensing lens positioned at the front end of said tube body with its optical axis parallel to the optical axis of said objective lens, a light receiving body positioned behind said condensing lens and within said annular recess, an adjustable annular diaphragm mounted within said tube body between said condensing lens and said light receiving body, said diaphragm having a group of slit-like iris openings therein, the invention being characterized in that the optical axis of said condensing lens is spaced parallel to, and offset from, the optical axis of said light receiving body.

2. The combination of claim 1 wherein said light receiving body comprises a plurality of light sensitive, horizontally extending cadmium sulfide electrodes retained in a transparent body, and said iris openings on said diaphragm are of sufficient length and angular inclination with reference to said electrodes so that light passing through said openings strikes a plurality of said electrodes.

References Cited by the Examiner

UNITED STATES PATENTS

| 3,000,281 | 9/1961 | Rentschler | 95—64 X |
| 3,087,379 | 4/1963 | Rogers | 95—10 X |
| 3,192,841 | 7/1965 | Reymond | 95—64 |
| 3,205,796 | 9/1965 | Lieser | 95—10 |

NORTON ANSHER, *Primary Examiner.*

J. F. PETERS, *Assistant Examiner.*